Aug. 7, 1945.   W. J. TINER ET AL   2,381,190
TRAILER CONNECTION
Filed Sept. 13, 1943
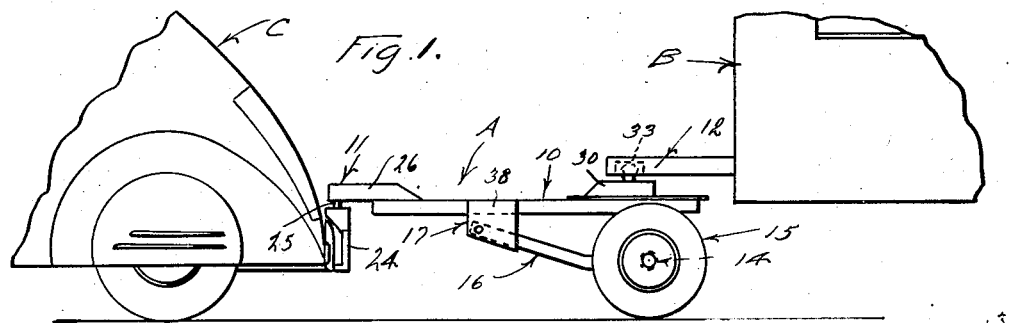
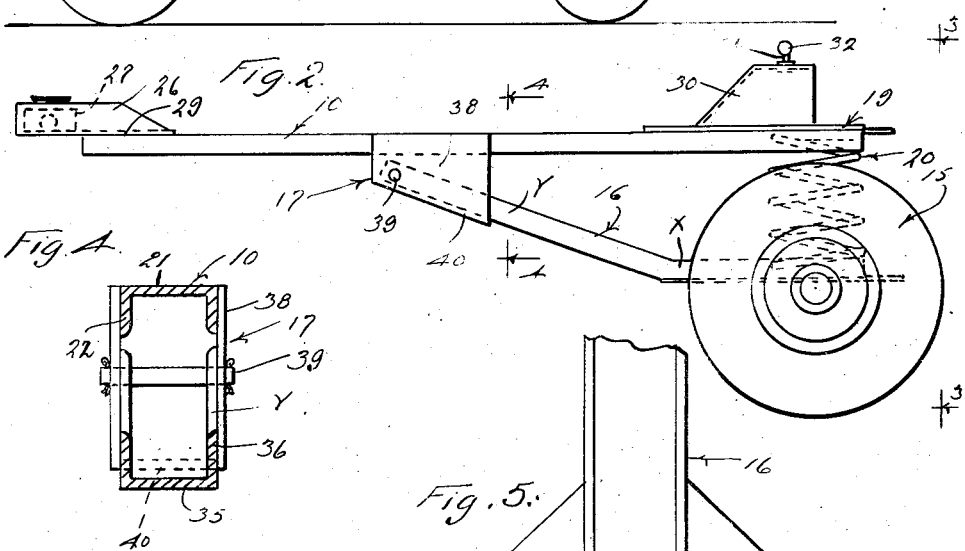
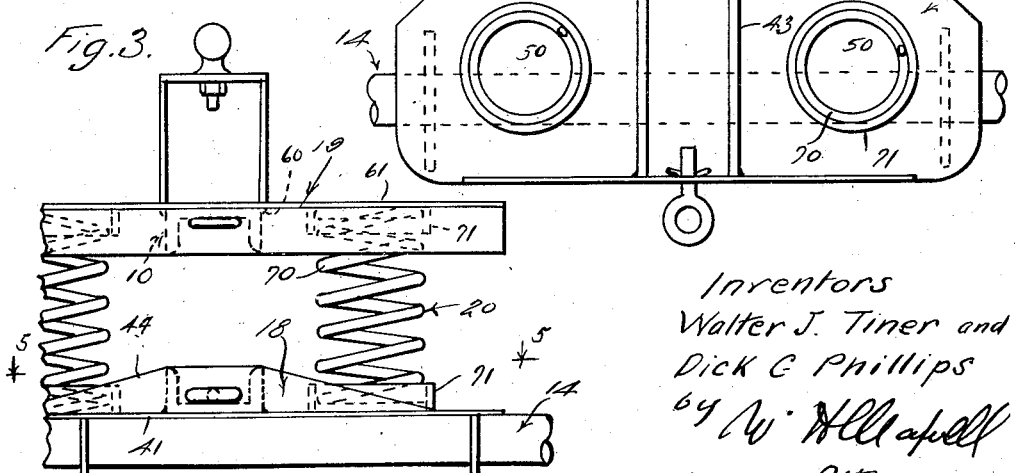
Inventors
Walter J. Tiner and
Dick G. Phillips
Attorney Patented Aug. 7, 1945

2,381,190

UNITED STATES PATENT OFFICE 2,381,190

TRAILER CONNECTION

Walter J. Tiner and Dick G. Phillips,
Long Beach, Calif.

Application September 13, 1943, Serial No. 502,132

10 Claims. (Cl. 280—33.4)

This invention relates to a trailer connection and has particular reference to a device to be used as a connection between a trailer such as a trailer house and a motor vehicle such as an automobile. A general object of the present invention is to provide a simple, practical and inexpensive device of the character mentioned.

Trailer houses for motor vehicles vary considerably in size, shape, weight and construction. It is common for trailer houses to be fairly large and heavy compared to the vehicles employed to draw them, and they are, in many instances, difficult to handle or maneuver. When the ordinary or average trailer house, or trailer as we will term it, is attached to the average automobile by the usual means of connection, certain difficulties are experienced. For instance, the weight imposed on the rear portion of the automobile by the trailer overloads the automobile, particularly the springs and tires. In many instances trailers are connected with automobiles so that they materially interfere with the handling or maneuverability of the automobile, and may even be dangerous. It is not uncommon for a trailer to cause sway or lateral force to be applied to the motor vehicle used to draw it to such an extent that the motor vehicle becomes out of control of the operator.

It is a general object of our present invention to provide a connection for trailers and motor cars or automobiles by which the principal load or vertical thrust of the trailer is taken by the connection so that it is not transmitted to the automobile. By our invention we provide a connection having a pair of wheels which take the load of the trailer which is commonly communicated to the automobile.

Another object of our invention is to provide a connection of the character referred to whereby the trailer is linked to the automobile so that it follows or trails behind the automobile without exerting undue lateral forces such as might tend to throw the automobile out of control. With the device of the present invention the trailer will freely track or follow behind the automobile and there is no whipping or tendency to throw the automobile from side to side.

Another object of our invention is to provide a trailer connection of the character referred to which is extremely simple and inexpensive of manufacture. By our invention we have provided a dolly type of connection which involves a minimum number of simple, inexpensive parts, making it extremely light and easy to handle. The fact that the device is made of few parts which are simple and inexpensive of manufacture is of commercial importance.

The various objects and features of our invention will be fully understood from the following detailed description of a typical preferred form and application of the invention, throughout which description reference is made to the accompanying drawing, in which:

Fig. 1 is a side elevation of the trailer connection provided by our invention showing it in use connecting the forward portion of a trailer with the rear portion of an automobile. Fig. 2 is an enlarged side elevation of the connection shown apart from the trailer and automobile. Fig. 3 is an enlarged detailed view taken at the rear of the device, being a view taken as indicated by line 3—3 on Fig. 2. Fig. 4 is an enlarged detailed sectional view taken as indicated by line 4—4 on Fig. 2, and Fig. 5 is a plan view taken as indicated by line 5—5 on Fig. 3.

The trailer connection or device provided by our invention is applicable, generally, for use in connecting trailers with motor vehicles. In its preferred form the invention is particularly suited for connecting the ordinary type of trailer with an average motor vehicle or automobile. In the drawing the device or connection A provided by our invention is shown connecting a typical trailer B with an ordinary automobile C. It is to be understood, of course, that the structure of the invention may be varied as circumstances require, to accommodate it to variations in the trailer or in the automobile.

The device of the present invention includes, generally, a draw bar or link 10 which serves as the principal element connecting the trailer and automobile, means 11 at the forward end of the link to connect it with the automobile C, means 12 at the rear end of the link to connect it with the trailer B, an axle 14 disposed transversely under the rear end portion of the link, wheels 15 carried by the axle, an arm 16 provided to carry the axle, means 17 pivotally connecting the arms 16 and the link to allow limited vertical movement of the axle carrying portion of the arm, means 18 connecting the arm 16 and axle 14 preferably in the form of a tie plate, a tie plate 19 corresponding to that of the means 18 connected, that is, applied to the rear end portion of the link 10 directly above the means 18, and spring means 20 arranged to act between the means 18 and plate 19.

The link 10 acts as a draw bar or coupling element between the automobile C and the trailer B and in its preferred form it is in the nature of a beam or connecting rod. In practice we employ a single elongate member in the form of a channel iron arranged so that its web 21 is up while its flange 22 projects downwardly. The details of the link 10 may, in practice, be varied considerably depending upon the particular elements to be connected, that is, upon the trailer and the automobile. In practice it has been found that if the link is made about four feet long it is suitable for the average situation.

The means 11 provided at the forward end of the link 10 to connect with the automobile C will, in practice, vary depending upon the particular form of connection employed. The usual connection used in cases of this kind is a ball and socket connection including a ball or spherical element supported on a stem carried by one of the parts to be connected and a socket carried by the other part to receive the ball. In the particular case illustrated we have shown a bracket 24 on the rear end portion of the automobile C and a stem 25 projecting upwardly from the bracket 24, which stem may be provided with the conventional ball. In the particular case illustrated the means 11 provided to cooperate with the parts on the automobile includes a bracket 26 fixed to the rear end portion of the link 10 and carrying a socket member 27 to receive the complementary part on the automobile. For simplicity of construction the bracket 26 is preferably formed of heavy sheet material such as sheet steel and is secured to the link 10 by welding along the lines 29.

The means 12 provided at the rear of the link to connect the link with the trailer is similar, generally, to the means 11 except that the bracket 30 corresponding to bracket 26 instead of carrying a socket member carries a pin 31 provided with a ball 32 adapted to cooperate with a socket member 33 applied to the trailer B. The bracket 30 may be welded or otherwise secured to the link 10 or, as is shown in the form of construction illustrated, to the plate 19 which, in turn, is secured to the link.

It is to be understood that our invention is not concerned with the details of construction of the connecting means 11 and 12 and that the details illustrated are simply for purpose of example.

The axle 14 of the device is arranged transversely of the link 10 under the rear end portion thereof and is rigidly held in the transverse position through the structure hereinafter described. Further, the normal position of the axis is a suitable distance below the link 10, as is established through the elements hereinafter described. The axle carries a wheel 15 at each end so that the wheels are symmetrically disposed with reference to the link 10. In practice any suitable wheel and axle construction, such as is common to motor vehicles, may be employed in carrying out the invention.

The arm 16 is the principal element tying or connecting the wheel carrying axle 14 with the link 10 and it serves, through the means 17 and 18, to connect the axle with the link so that the axle has limited vertical movement relative to the rear end portion of the link. In practice the arm 16 is preferably formed of a length of channel iron which may be arranged so that its web 35 is down while its flanges 36 project up. It is desirable, in practice, to have the plate means 18, which connects the arm and axle, normally located in a substantially horizontal plane and for this reason the rear end portion X of the arm is horizontally disposed. The main or forward portion Y of the arm extends forward and upwardly from the portion X to a point adjacent the link 10.

The means 17 provided for connecting the arm 16 with the link 10 serves to pivotally connect the arm 16 with the link 10, limits the downward pivotal movement of the arm relative to the link, and guides the pivotal movement of the arm. The means 17 includes flanges 38 fixed to the sides of the link 10 to depend therefrom. The forward end portion of the arm part Y fits between the flanges and is pivotally supported between the flanges on a pivot pin 39 carried between the flanges. A web 40 extends between and connects the lower edges of the flanges 38 and forms a rest or stop limiting the downward pivotal movement of the arm relative to the link 10. The outer walls of the flanges 36 of arm 16 slidably fit the inner walls of the flanges 38 so that the arm is guided between the flanges in the course of its pivotal movement, taking lateral strain off of the pivot pin 39. The construction which we have provided for the means 17 is extremely simple and inexpensive of manufacture and is at the same time neat, compact, and highly practical and efficient in operation.

The means 18 provided to connect the arm 16 and axle 14 is in the form of a plate 41 resting on the central portion of the axle 14 and secured to and braced relative to the axle by means of suitable flanges 42 which depend from the under side of the plate and have openings which pass the axle. The rear horizontal portion X of the arm 16 bears on the top side of the plate 41 and is secured in position by welding 43 and is braced by suitable angle braces 44 disposed between the top of the plate 41 and the outer sides of the arm flanges 36. The plate 41 is sufficiently wide to project a substantial distance from either side of the arm 16 to bear along a considerable length of the axle 14 and to form shoulders or areas which act as rests 50 for the spring means hereinafter described. Further, the plate 41 projects forward from the axle a considerable distance so that it has a long, effective connection with the portion X of the arm 16. The forward corners of the plate are preferably beveled or cut away, as shown in Fig. 5, so that the forwardly projecting portion of the plate is substantially triangular in plan configuration.

The plate 19 located at the rear portion of the link 10 is shaped to correspond to the plate 41 and is arranged directly above the plate 41 to be in vertical register therewith and is fixed to the link 10 by welding 60. In the preferred arrangement the plate 19 is fixed to the top of the beam so that it has overhanging portions 61 at either side of the beam opposite the parts 50 of the plate 41. As shown in the drawing, the bracket 30 of means 12 is welded or otherwise secured to the top of the plate 19 opposite or above the link 10.

The spring means 20 preferably comprises two helical compression springs 70 arranged symmetrically at opposite sides of the longitudinal axis of the device so that there is a spring between each part 50 of the plate 41 and the corresponding part 61 of the plate 19. The springs 70 may be retained in proper operating position through various means. In practice we prefer to provide annular collars 71 on the upper sides of the parts 50 of plate 41 and if necessary on the under sides of part 61 of plate 19, so that they form sockets receiving the ends of the springs. The collars are preferably welded to the plates.

When the device is assembled, as shown in the drawing, the means 17 limits the downward movement of the arm 16 relative to the link 10 and does not allow the plates to separate so that the springs can escape from the collars 71.

When the device is in use the forward end of the link 10 is swively connected to the rear end of the automobile C through the means 11 and the rear end of the link 10 is swively connected to the forward end of the trailer B through the means 12. This provides an ideal draft means whereby the trailer is drawn behind the automobile B. It will be apparent from the drawing that the load or vertical thrust of the trailer B is taken through the device that we have provided so that it is communicated mainly to the wheels 15 of the connection. In practice it is desirable to locate the connecting means 12 slightly forward of the axle 14 so that there is a slight downward turning movement on the link 10 causing some downward thrust to be applied to the rear end of the automobile C. This, however, is a negligible force insofar as the automobile is concerned.

During operation the springs 20 allow for suitable vertical movement or working of the forward end portion of the trailer, this motion being effectively guided and restrained through the arm 16 and the connecting means 17 as hereinabove described. It is to be understood, of course, that in practice suitable safety appliances such as safety connecting chains, or the like, may be applied, in addition to the parts hereinabove described, as circumstances require. Such devices being common and well known, we have not illustrated them in the present disclosure.

Having described only a typical preferred form and application of our invention we do not wish to be limited or restricted to the specific details herein set forth, but wish to reserve to ourselves any variations or modifications that may appear to those skilled in the art or fall within the scope of the following claims:

Having described our invention, we claim:

1. A device for connecting a trailer and a motor vehicle including, a link, means for connecting one end of the link to the trailer, means for connecting the other end of the link to the vehicle, a rigid axle arranged transversally below the rear portion of the link, spring means supporting the rear end portion of the link from the axle, wheels on the end portions of the axle, and an arm connected to the axle and extending upward and forward from the axle and pivotally connected to the link.

2. A device for connecting a trailer and a motor vehicle including, a link, means for connecting one end of the link to the trailer, means for connecting the other end of the link to the vehicle, a rigid axle arranged transversally below the rear portion of the link, spring means supporting the rear end portion of the link from the axle, wheels on the two end portions of the axle, an arm secured to the middle portion of the axle and extending forward and upward therefrom, and means pivotally connecting the forward end of the arm to the link on an axis parallel with the axle.

3. A device for connecting a trailer and a motor vehicle including, an elongate link, means for connecting one end of the link to the trailer, means for connecting the other end of the link to the vehicle, an axle arranged transversally below the rear portion of the link, wheels on the outer end portions of the axle, a spring between the link and axle, and an arm connected to the middle portion of the axle and extending upward and forward from the axle in a vertical plane parallel with the link and having its forward end pivotally connected to the link on a transverse axis.

4. A device for connecting a trailer and a motor vehicle including, a link, means for connecting one end of the link to the trailer, means for connecting the other end of the link to the vehicle, an axle arranged transversally below the rear portion of the link, wheels on the outer end portions of the axle, a single central arm secured to the middle portion of the axle and extending forward and upward therefrom to the link, spring means between the axle and the rear end portion of the arm including a compression spring, and means pivotally connecting the forward end of the arm to the link on an axis parallel with the axle.

5. A device for connecting a trailer and a motor vehicle including, a link, means for connecting one end of the link to the trailer, means for connecting the other end of the link to the vehicle, a single axle arranged transversally below the rear portion of the link, wheels on the outer end portions of the axle, an arm secured to the middle portion of the axle and extending forward and upward therefrom, and means pivotally connecting the forward end of the arm and the link on an axis parallel with the axle including flanges depending from the link to receive the forward end of the arm between them to brace it laterally, and a pivot pin extending through the flanges and arm.

6. A device for connecting a trailer and a motor vehicle including, a link, means for connecting one end of the link to the trailer, means for connecting the other end of the link to the vehicle, an axle arranged transversally below the rear portion of the link, wheels on the axle, an arm secured to the axle and extending forward and upward therefrom, and means pivotally connecting the arm and link on an axis parallel with the axle including flanges depending from the link to receive the forward end of the arm between them, a pivot pin extending through the flanges and arm, and a web connecting the flanges and acting to limit downward pivotal movement of the arm.

7. A device for connecting a trailer and a motor vehicle including, a link, means for connecting one end of the link to the trailer, means for connecting the other end of the link to the vehicle, a single axle arranged transversally below the rear portion of the link, wheels on the end portions of the axle, a plate secured to the middle portion of the axle below the link, a single central arm secured to the plate and extending forward and upward therefrom and pivotally connected to the link through a single pivotal connection, a second plate secured to the link above the first mentioned plate, and a spring between the plates.

8. A device for connecting a trailer and a motor vehicle including, a link, means for connecting one end of the link to the trailer, means for connecting the other end of the link to the vehicle, a single axle arranged transversally below the rear portion of the link, wheels on the end portions of the axle, a plate secured to the middle portion of the axle below the rear end portion of the link, a single central arm secured to the plate and extending forward and upward therefrom and having its forward end pivotally connected to the link, a second plate secured to the link above the first mentioned plate, and helical compression springs between the plates, the springs being spaced in the direction of the axle.

9. A device for connecting a trailer and a motor vehicle including, a link, means for connecting one end of the link to the trailer, means for connecting the other end of the link to the vehicle, a single axle arranged transversally below the rear portion of the link, wheels on the outer end portions of the axle, a plate secured to the middle portion of the axle, a single central arm rigidly secured to the plate and extending forward and upward therefrom and having its forward end pivotally connected to the link, a second plate secured to the rear end portion of the link above the first mentioned plate, helical compression springs between the plates, and collars on one of the plates holding the springs against displacement.

10. A device for connecting a trailer and a motor vehicle including, a link, means for connecting one end of the link to the trailer, means for connecting the other end of the link to the vehicle, an axle arranged transversally below the rear portion of the link, wheels on the axle, a plate secured to the axle intermediate its ends, an arm secured to the plates and extending forward and upward therefrom, flanges depending from the sides of the link to receive the arm between them, a pivot pin extending through the flanges and arm, a web connecting the flanges and limiting downward pivotal movement of the arm, a plate secured to the link above the first mentioned plate, and helical compression springs between the plates.

WALTER J. TINER.
DICK G. PHILLIPS.